Jan. 29, 1957 L. B. SMITH 2,779,434
CENTRIFUGAL DUST COLLECTOR
Filed Aug. 8, 1955 4 Sheets-Sheet 1
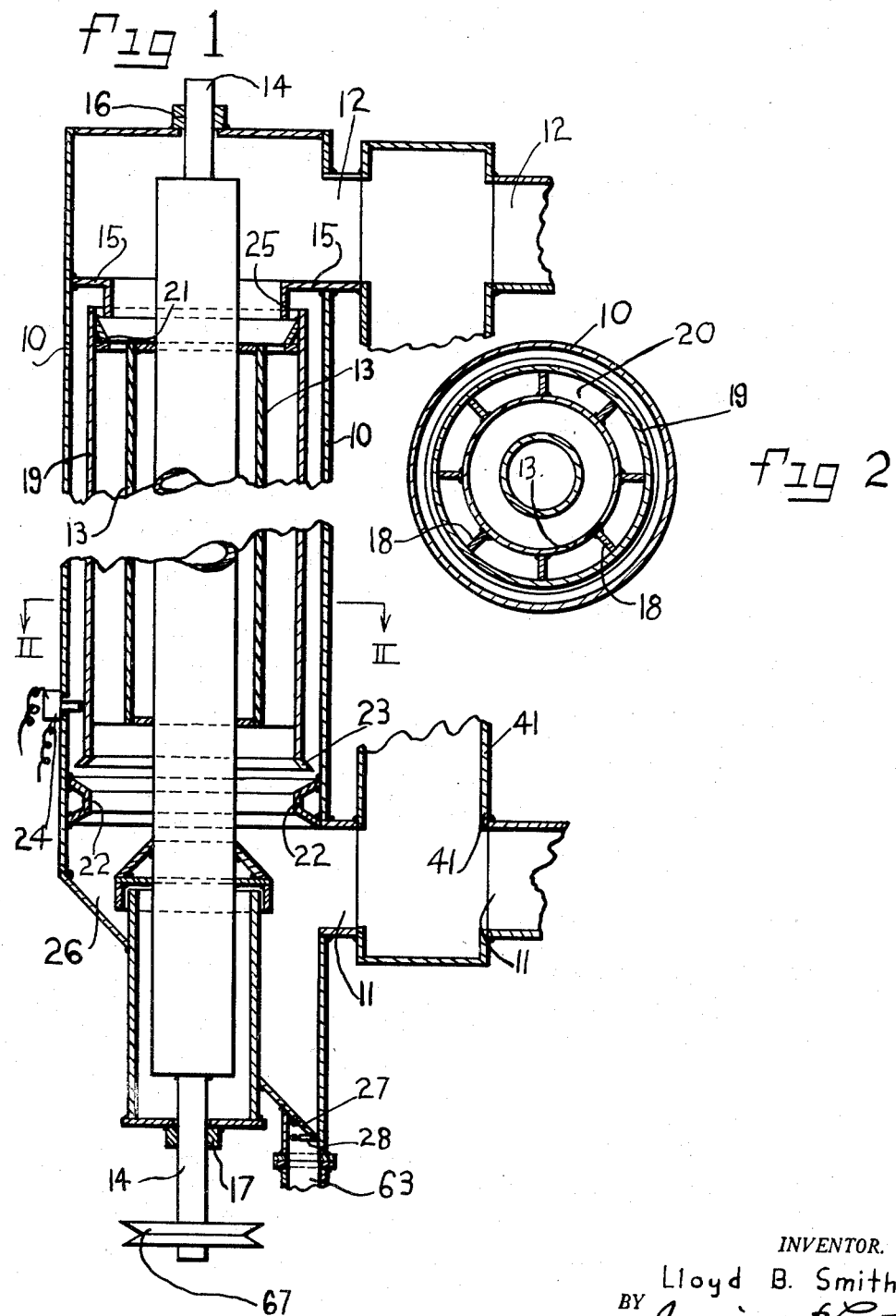
INVENTOR.
Lloyd B. Smith
BY Jennings & Carter
Attorneys Jan. 29, 1957 L. B. SMITH 2,779,434
CENTRIFUGAL DUST COLLECTOR
Filed Aug. 8, 1955 4 Sheets-Sheet 3 fig 4 fig 8 fig 9

INVENTOR.
Lloyd B. Smith
BY Jennings & Carter
Attorneys

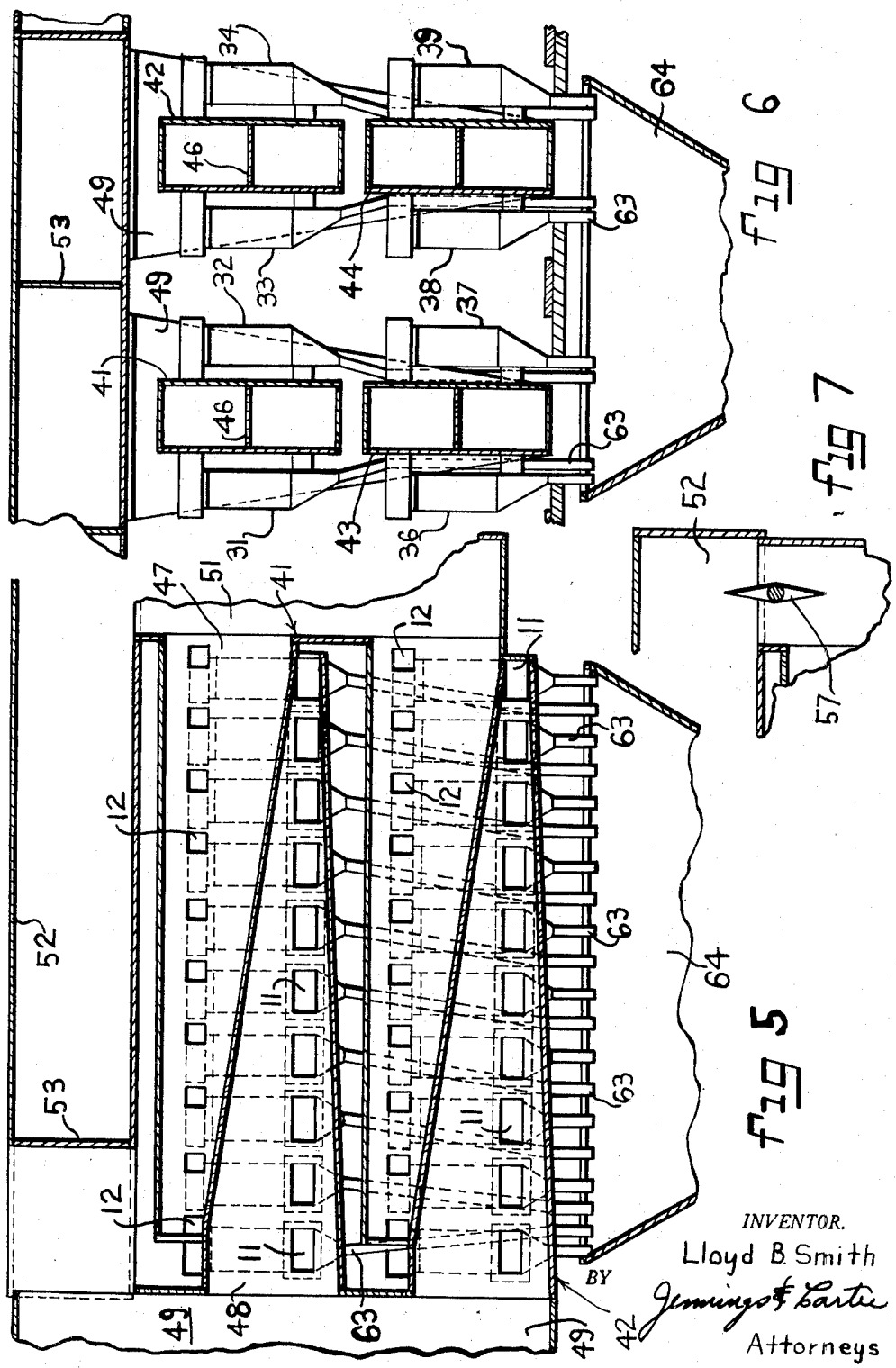

United States Patent Office 2,779,434
Patented Jan. 29, 1957

2,779,434

CENTRIFUGAL DUST COLLECTOR

Lloyd B. Smith, Birmingham, Ala.

Application August 8, 1955, Serial No. 526,957

9 Claims. (Cl. 183—76)

This invention relates to apparatus for separating solid particles from a gas and more particularly to apparatus of the type disclosed in my copending application, Serial No. 458,519, filed September 27, 1954, now Patent No. 2,755,885, issued July 24, 1956, in which the solid particles are thrown out of a moving gas stream by centrifugal force and entrapped along the wall of a rotating cylinder. The principal object of this invention is to provide apparatus of the character designated which shall be of a more simple and economical design and more efficient in operation than that disclosed and claimed in my application aforesaid.

A more specific object of my invention is to provide apparatus for separating solids from gases which shall include a rotary drum having an impervious outer wall spaced from and rotating with the drum with radial axially extending vanes between the drum and the outer wall dividing the space between the two into axial passages through which the gas to be cleaned is passed together with improved means to impede the axial flow of gases along the impervious outer wall and cause solids thrown out by centrifugal force to the entrapped against the wall.

Another object of my invention is to provide an assembly of a plurality of apparatus constructed in accordance with my invention together with improved means for starting and stopping selected groups of the apparatus alternately whereby to maintain continuous operation of a part of the units of apparatus while collected solids are being discharged from other units.

A still further object of my invention is the provision of an assembly of a multiplicity of dust collectors of the character designated together with improved means for conducting dust laden gases thereto and cleaned gases therefrom which shall be of simple design and occupy a minimum of space, and in which selected groups of collectors may be stopped at regular intervals for the removal of collected solids while the remainder continue in operation.

Briefly, the individual units of my invention comprise each a cylindrical housing having a suitable inlet for gas to be cleaned and an outlet for cleaned gas and which is preferably vertically disposed, and in which is journalled a rotary drum. Secured to the drum are a plurality of axially extending radial vanes or ribs which extend substantially the length of the drum. Surrounding the drum and mounted on the ribs is an impervious wall, the ribs or vanes dividing the space between the drum and the wall into a plurality of axial passages through which dust laden gases are caused to flow. The impervious wall is preferably smooth and is provided at one end with an inturned flange which impedes the flow of gases through the passages adjacent the wall thus creating relatively quiet zones in which the solids settle out. As in my prior application aforesaid rotation of the drum is stopped periodically to discharge collected solids.

In an assembly of a multiplicity of my improved collectors I mount the units side by side in parallel pairs of rows with a duct divided longitudinally by a diagonal partition extending longitudinally between each pair of rows; one part of the duct being connected to the inlets of all the collectors in both rows, and the other part to the outlets of said collectors. Other pairs of rows similarly arranged may be superposed over the first mentioned pairs of rows whereby to provide the necessary capacity in a minimum of space. Mounted over all the rows is a plenum chamber divided longitudinally by a diagonal wall on one side of which dust laden gases are admitted while the other side serves as an outlet for cleaned gas. Vertically extending ducts at one end of the assembly connect the inlet portion of the plenum chamber to the inlet portion of all the longitudinally extending ducts and other vertically extending ducts at the other end of the assembly connect the outlet portion of the plenum chamber to the outlet portions of all the longitudinally extending ducts. Means are provided for stopping selected groups of the collectors at regular intervals for the discharge of solids therefrom, and while stopped to purge the collectors of the solids therein.

Apparatus embodying features of my invention is illustrated in the accompanying drawings, forming a part of this application, in which:

Fig. 1 is a vertical sectional view through one of the collector units;

Fig. 2 is a sectional view taken along the line II—II of Fig. 1;

Fig. 4 is an end view of the assembly, the drive connections between the motors and the rotary drums being omitted for sake of clarity;

Fig. 5 is a sectional view of the assemby taken along the line V—V of Fig. 3;

Fig. 6 is a sectional view taken along the line VI—VI of Fig. 3;

Fig. 7 is a detail sectional view of one of the outlet dampers employed in my improved assembly;

Fig. 8 is a detail sectional plan view showing the manner of mounting the driving motors and driving the individual collector units; and, Fig. 9 is a fragmentary elevational view of the drive shown in Fig. 8 with parts broken away and in section.

Figure 3:
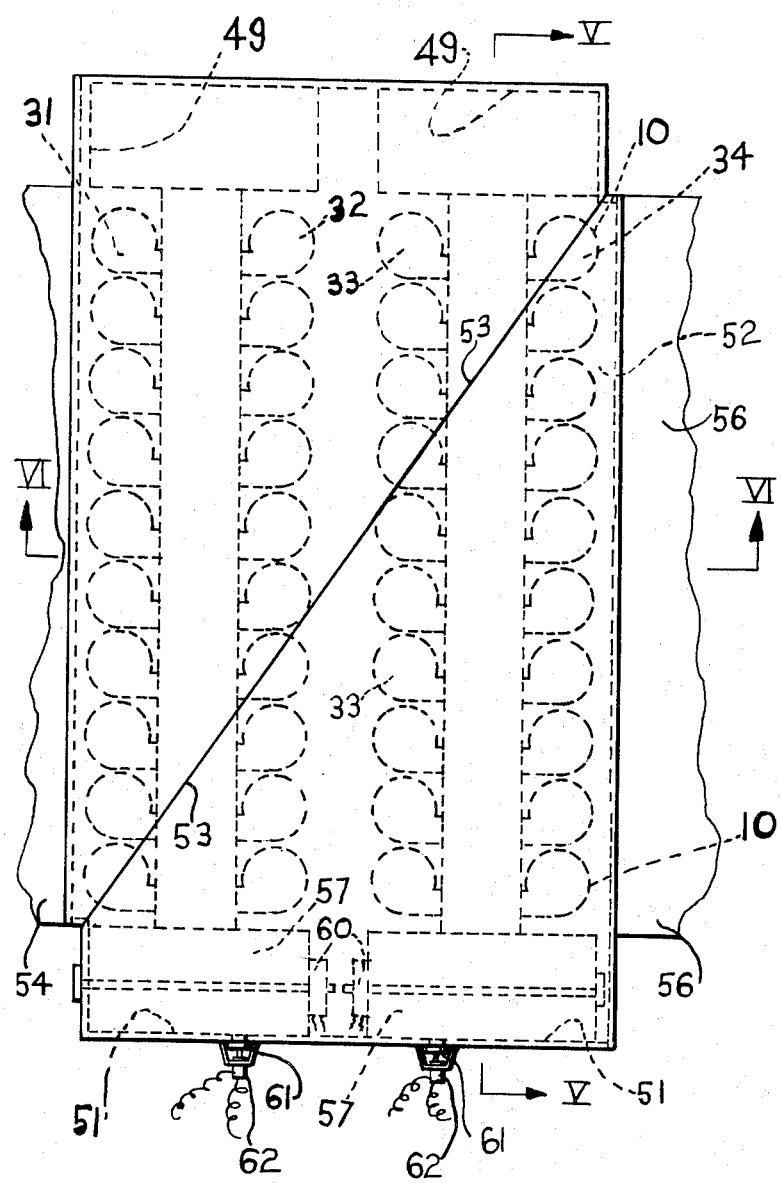
Fig. 3 is a plan view of an assembly of collector units made in accordance with my invention.

Referring now to Fig. 1 of the drawings, the individual units of my invention each comprise a cylindrical housing 10 which is preferably vertically disposed and which has an inlet 11 for gas to be cleaned at the lower end thereof and an outlet 12 for cleaned gas at the upper end thereof. Mounted in the housing 10 is a rotary drum 13, closed at the ends and having a shaft 14 supported in suitable bearings indicated at 16 and 17. Secured to the drum are a plurality of axially extending radial vanes or ribs 18 which extend substantially the length of the drum. Surrounding the vanes 18 and secured thereto as by welding is an outer imperforate, smooth shell 19 which is open at the top and bottom to provide, with the vanes, axial passages 20 around the drum extending from end to end thereof. At the upper end of the drum 13 there is provided an inturned flange 21 on the shell 19 which overhangs the axial passages 20. At the lower end of the casing 10 there is provided a restricting ring 22 just in front of the inlet 11 for gases to be cleaned and which serves to decrease the area and increase the velocity of gases flowing therethrough so as to direct them upwardly into the passages 20. The lower end of the shell 19, immedately above the ring 22, is flared as shown at 23 to aid in causing the gas to flow upwardly through the passages. The housing 10 is provided with a transverse partition 15 in its upper end which is open over the drum 13 and is provided with a ring 25 which extends downwardly inside the upper end of the shell 19. In operation the ring 25 serves to separate the outer annulus of gases flowing through the passages 20.

These gases, due to the lower static pressure at the lower end of the drum 13, move downwardly around the drum to be re-admitted into the lower ends of the passages with the incoming gas to be cleaned.

In operation, with a drum 13 around 15 inches in diameter, rotated at an angular velocity of from 2000 to 3000 revolutions per minute there is imparted to the solids contained in the gases centrifugal force of from 800 to 2000 times gravity. Gases introduced into the housing 10 at the inlet 11 pass upwardly through the passages 20 and thence through the outlet 12 for cleaned gas. The overhanging flange 21 acts to impede the flow of gases through the passages 20 and creates along the wall of the axial passages a relatively quiet zone in which the solids settle out. At intervals, rotation of the cylinders is stopped and the cylinders vibrated by any suitable means such as the vibrator indicated diagrammatically at 24 which causes the collected solids to fall down through the housing into a hopper 26 at the lower end thereof. A pivoted weighted door 27 at the bottom of the hopper provides means whereby when the weight of the solids overbalances the weight 28 on the door, the door will open and the solids be discharged from the hopper.

In some industries it becomes necessary to remove the solids from relatively large volumes of gases so that a multiplicity of units such as are herein described are required. Obviously, the centrifugal force developed and other operating details place a limit upon the size and diameter of units which may be employed in accordance with my invention and accordingly, I have found it more economical to group the units in such a way that a large volume of gas can be passed directly through a multiplicity of the units. Referring particularly to Figs. 3 to 6 of the drawings, I show a preferred form of such installation. In accordance with this arrangement, I mount the housings 10 in side-by-side parallel rows such as shown at 31, 32, and 33, 34, providing a sufficient number of pairs of rows to accommodate the gases to be cleaned. To simplify the installation further, the rows 31, 32 may be superposed over rows 36 and 37 and the rows 33 and 34 be superposed over the rows 38 and 39. Any desired number of units may be placed in a row, within practical limits, as indicated in Fig. 3.

Extending between the rows of housings 31 and 32, from end to end thereof is a duct 41. A similar duct 42 extends between the rows 33 and 34. Similar ducts 43 and 44 extend between the rows 36 and 37, and 38 and 39, respectively. Each of the ducts just described is divided longitudinally by means of a horizontal partition 46 which extends diagonally from one end to the other thus dividing the duct into upper and lower portions. The upper portion 47 of each duct is connected to all of the outlets 12 for cleaned gas in the rows of housings with which it is associated. The lower half 48 of each duct is connected to all of the inlets 11 for gas to be cleaned in the rows of housings with which it is associated. The lower half 48 of each duct opens into and communicates with a vertical duct 49 and the upper half of each horizontal duct opens into and communicates with a vertical duct 51 for carrying the cleaned gas away.

Superimposed over all of the assembly just described is a large plenum chamber 52 which is divided longitudinally from end to end thereof by a vertical partition 53 which extends diagonally from end to end of the chamber. An inlet duct 54 is connected to the chamber along one side thereof and an outlet duct 56 is connected to the chamber on the outlet side thereof. The vertical ducts 49 open into and communicate with the plenum chamber at one end of the assembly as shown in Figs. 3 and 5 while the vertical ducts 51 open into and communicate with the plenum chamber on the other side of the partition 53 at the opposite end of the assembly as shown in Figs. 3 and 5.

Mounted in each of the vertical ducts 51 adjacent its connection with the plenum chamber is a damper 57 which may be operated by a motor 60 and which serves to control the flow of gases through the pairs of rows of housings with which each of the vertical ducts is associated. It will be apparent that when the damper 57 is closed no gas can flow through the housings with which the particular duct 51 is associated and when the damper 57 is open gases are free to flow through the housings and out through the outlet 56 from the plenum chamber. By thus arranging the vertical ducts and the dampers 57 I am enabled to control a multiplicity of units with one damper.

In the operation of an assembly of my improved collectors, the static pressure within an assembly is usually below atmospheric and while the cylinders or drums 13 are rotating there is a great deal of dust in suspension within the axial passages surrounding each drum as well as in the housing. It is contemplated that in the operation of an assembly of units as herein described that one or more pairs of rows of units will be stopped at a time in order to discharge the solids from the cylinders. In such event, it is desirable that the dust in suspension in the housing be caused to move downwardly in the housings. Accordingly, I provide, below each of the dampers 57, a purge valve 61 operated in any suitable manner as by a solenoid 62 to open and admit atmospheric air into the vertical ducts and the housings with which they are associated at times when the associated collectors are temporarily stopped. The atmospheric air entering the vertical ducts passes back through the horizontal ducts and into the outlets of the housings causing a precipitation of the solids therein.

Connected to the lower end of the hopper 26 of each of the individual units is a pipe 63 which extends downwardly into a large hopper 64 located and extending beneath the entire assembly. Thus, when a section of the units is stopped for the discharge of solids, all of the solids are discharged into the hopper 64 and may be removed therefrom in any suitable manner.

The individual units of the collectors may be driven in any suitable manner as by electric motors 66 which, for convenience, may be so disposed as for each motor 66 to drive two of the units. As shown in Fig. 1, a pulley 67 may be provided at the lower end of the shaft 14 of each of the units and the motor 66 be disposed laterally and between two of the units as shown in Fig. 8. Two belts, 68 and 69, connect a double pulley 70 on the motor 66 to the pulleys 67 at the lower end of the units. The motor 66 should be biased laterally by means of the spring 71 whereby to maintain the belts 68 and 69 in proper tension.

It is contemplated that in the operation of my improved assembly, all of the motors driving the units associated with one of the vertical ducts 51 and its associated inlet duct 48 will be stopped and started in unison. When the motors are stopped, the damper 57 is closed and the purge valve 61 is opened. At the same time the vibrator 24 on each of the units is put in operation to jar the solids loose from the wall of the outer shell 19 of each unit. It will be understood that all of these operations may be carried on in sequence by any suitable means, for example such as are shown in my previously filed application before mentioned, Serial No. 458,519, such sequential control forming no part of my present invention.

From the foregoing it will be apparent that I have devised an improved dust collector together with means for mounting and controlling a multiplicity of such collectors in an assembly of dust collectors. In actual operation, I have found that the apparatus herein disclosed is highly efficient, reliable in operation, and one which consumes a minimum of power in comparison with apparatus designed for this purpose and heretofore known to me.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus for separating solids from gases, an elongated imperforate cylinder closed at the ends, a smooth imperforate wall open at the ends surrounding the cylinder in spaced relation thereto, a plurality of axially extending vanes joined to the cylinder and to the wall and forming therewith axially extending passages, means to introduce solids laden gases into the passages at one end of the cylinder, means within the outer wall at the other end of the passages to impede the outward flow of gases therefrom and create relatively quiet zones in the passages along the outer wall, and means to rotate the cylinder at a velocity sufficient to cause the solids to settle out and be retained in said passages to be discharged only upon stopping rotation of the cylinder.

2. In apparatus for separating solids from gases, an elongated vertically disposed housing having an inlet at its lower end and an outlet at its upper end, a vertically disposed cylinder mounted to rotate in the housing, a relatively smooth imperforate shell surrounding the cylinder and defining therewith a plurality of axially extending passages open at the ends, means to introduce solids-laden gases into the lower ends of said passages, an inturned flange at the upper end of the shell overhanging the passages, means to rotate the cylinder at a velocity sufficient to cause the solids to settle out in said passages, and means operable at intervals of time upon stopping rotation of the cylinder to discharge solids from the bottom of the housing.

3. In apparatus for separating solids from gases, an elongated vertically disposed housing having an inlet at its lower end and an outlet at its upper end, a vertically disposed cylinder mounted to rotate in the housing, a plurality of radial vanes mounted on the cylinder and extending axially substantially the length thereof, a relatively smooth imperforate wall open at the ends mounted on the vanes to form therewith a plurality of axially extending passages, an inturned flange on the wall overhanging the upper ends of the passages, means to introduce gases to be cleaned into the lower ends of the passages to pass upwardly therethrough to the outlet, means to rotate the cylinder at a velocity sufficient to impart to the solids in the gases centrifugal force or from 800 to 2000 times the force of gravity and cause the solids to settle out in said passages on the imperforate wall, and means operable upon stopping rotation of the cylinder to discharge solids thus collected from the lower end of the housing.

4. In a dust collector assembly a multiplicity of dust collectors each embodying a vertically disposed cylindrical housing having an inlet at the lower end for gas to be cleaned and on outlet at the upper end, said housings being disposed in a pair of parallel adjacent rows, an elongated duct extending between the pair of rows and divided longitudinally by a diagonally extending horizontal partition, the upper part of said duct being connected to the outlets of all the adjacent housings and the lower part of the duct being connected to all the inlets of the adjacent housings, a plenum chamber mounted over the assembly and extending from end to end with a vertical partition extending diagonally from end to end thereof, an inlet for gases to be cleaned at one side of the chamber, an outlet for cleaned gas at the other side of the chamber, a vertical duct at one end of the assembly connecting the inlet side of the plenum chamber to the inlet part of the first mentioned elongated duct, and a second vertical duct at the other end of the assembly connecting the outlet side of the first mentioned elongated duct to the plenum chamber.

5. A dust collector assembly as defined in claim 4 embodying a plurality of pairs of rows of housings arranged in side by side relation with separate vertical ducts connecting the inlet side of the plenum chamber to the inlet part of each of the elongated ducts and separate vertical ducts connecting the outlet side of each elongated duct to the plenum chamber.

6. A dust collector assembly as defined in claim 4 embodying a plurality of pairs of rows of housings arranged in side by side relation with separate vertical ducts connecting the inlet side of the plenum chamber to the inlet part of each of the elongated ducts and separate vertical ducts connecting the outlet side of each elongated duct to the plenum chamber, a damper in each of the vertical ducts connected to the outlet side of the plenum chamber, and means to operate the dampers selectively to control the flow of gases through the housings connected thereto.

7. A dust collector assembly comprising a plurality of pairs of parallel rows of dust collectors each embodying a housing having an inlet at its lower end and an outlet at its upper end in which housing a rotary dust collecting cylinder is located, said pairs of parallel rows being in superposed relation, an elongated duct extending between each pair of rows and having a horizontal partition extending from end to end thereof, the upper part of said duct being connected to all the outlets of said pair of rows of said housings and the lower part being connected to all the inlets of said pair of rows of said housings, a plenum chamber overlying the assembly and having a vertical partition extending diagonally from end to end thereof, an inlet for gas to be cleaned at one side of the plenum chamber on one side of the partition, an outlet for cleaned gas at the other side of the plenum chamber on the other side of the partition, a vertical duct at one end of the assembly connecting the inlet side of the plenum chamber to the lower side of the elongated ducts, and a second vertical duct at the other end of the assembly connecting the outlet side of the plenum chamber with the upper side of the elongated ducts.

8. A dust collector assembly as defined in claim 7 in which a single damper disposed in the vertical duct connected to the outlet side of the plenum chamber provides means to close off the flow of gas through the assembly.

9. A dust collector assembly comprising a plurality of pairs of parallel rows of dust collectors each embodying a housing having an inlet at its lower end and an outlet at its upper end in which housing a rotary dust collecting cylinder is located, said pairs of parallel rows being in superposed relation, an elongated duct extending between each pair of rows and having a horizontal partition extending from end to end thereof, the upper part of said duct being connected to all the outlets of said pair of rows of said housings and the lower part being connected to all the inlets of said pair of rows of said housings, a plenum chamber overlying the assembly and having a vertical partition extending diagonally from end to end thereof, an inlet for gas to be cleaned at one side of the plenum chamber on one side of the partition, an outlet for cleaned gas at the other side of the plenum chamber on the other side of the partition, a vertical duct at one end of the assembly connecting the inlet side of the plenum chamber to the lower side of the elongated ducts, and a second vertical duct at the other end of the assembly connecting the outlet side of the plenum chamber with the upper side of the elongated ducts, a damper disposed in the last mentioned duct adjacent its connection to the plenum chamber, and a valve disposed adjacent to and below the damper to admit air into said duct when the damper is closed.

References Cited in the file of this patent

UNITED STATES PATENTS

| 866,844 | Cottrell | Sept. 24, 1907 |
| 1,810,922 | Mills | June 23, 1931 |

FOREIGN PATENTS

| 882,033 | Germany | July 6, 1953 |